United States Patent
Morozov et al.

(10) Patent No.: US 9,069,625 B2
(45) Date of Patent: Jun. 30, 2015

(54) METHOD OF PARALLEL PROCESSING OF ORDERED DATA STREAMS

(71) Applicant: Joint stock company "InfoTeCS", Moscow (RU)

(72) Inventors: Vyacheslav Viktorovich Morozov, Moscow Region (RU); Leonid Anatolievich Tychina, Moscow (RU)

(73) Assignee: Joint Stock Company "InfoTeCS", Moscow (RU)

( * ) Notice: Subject to any disclaimer, the term of this patent is extended or adjusted under 35 U.S.C. 154(b) by 0 days.

(21) Appl. No.: 13/938,381

(22) Filed: Jul. 10, 2013

(65) Prior Publication Data

US 2014/0019992 A1    Jan. 16, 2014

(30) Foreign Application Priority Data

Jul. 11, 2012    (RU) .................................. 2012129031

(51) Int. Cl.

| G06F 3/00 | (2006.01) |
|---|---|
| G06F 9/44 | (2006.01) |
| G06F 9/46 | (2006.01) |
| G06F 13/00 | (2006.01) |
| G06F 9/54 | (2006.01) |
| H04L 12/54 | (2013.01) |
| G06F 9/50 | (2006.01) |

(52) U.S. Cl.
CPC .............. G06F 9/54 (2013.01); H04L 12/5693 (2013.01); G06F 9/5038 (2013.01)

(58) Field of Classification Search
CPC ...... G06F 9/54; G06F 9/5038; H04L 12/5693
USPC ........................................................ 719/313
See application file for complete search history.

(56) References Cited

U.S. PATENT DOCUMENTS

| 6,434,145 B1 | 8/2002 | Opsasnick et al. |
| 6,587,866 B1 * | 7/2003 | Modi et al. ..................... 718/105 |
| 7,051,066 B1 * | 5/2006 | Albert et al. .................. 709/202 |
| 2002/0107903 A1 | 8/2002 | Richter et al. |
| 2011/0116443 A1 * | 5/2011 | Yu et al. ........................ 370/328 |
| 2011/0145276 A1 | 6/2011 | Lee et al. |

FOREIGN PATENT DOCUMENTS

| RU | 2042193 C1 | 8/1995 |
| RU | 5350 U1 | 11/1997 |

OTHER PUBLICATIONS

Decision of Grant for related Russian application No. RU 2012129031.

* cited by examiner

*Primary Examiner* — Timothy A Mudrick
(74) *Attorney, Agent, or Firm* — Honigman Miller Schwartz and Cohn LLP

(57) ABSTRACT

The disclosure relates to parallel processing of multiple digital data streams. The method includes transferring portions of incoming streams and attributes thereof to processors and obtaining respective portions of output streams and providing a sequence of the portions. Providing includes searching for a processor which is processing a portion of a particular incoming stream that has been located in a particular first stream before a portion already processed in said processor, and when several such processors are found, selecting a processor which is processing a portion of the particular incoming stream that is closest to the processed portion of the particular incoming stream. The processed portion of the particular incoming stream (and previously processed portions of the incoming stream from other processors) is transferred to the selected processor. If no such processors are found, the processed portions of the incoming stream are transferred to a respective output stream.

1 Claim, 10 Drawing Sheets

METHOD OF PARALLEL PROCESSING OF ORDERED DATA STREAMS

TECHNICAL FIELD

The disclosure relates to computer engineering, in particular, to methods for parallel processing of multiple digital data streams, each stream representing a sequence of discrete data sets of a particular type, for example, IP packets, etc.

BACKGROUND

A frequent problem in processing digital data is to process in parallel multiple digital data streams typically having different speeds, by means of an automatic multi-channel device that provides necessary processing of each incoming stream and transferring of each incoming stream in the processed form to a respective output stream, wherein the characteristic data processing speed in each processing channel may be substantially less than the incoming stream speed, and the required non-delayed processing speed of each incoming stream is provided by presence of multiple processing channels.

An important pre-condition for successful and highly efficient operation of such devices is to precisely maintain the sequence of processed data in each output stream matched to the corresponding sequence in the incoming stream.

Data can be processed in different ways, for example, by converting input ATM protocol packets into output IP packets, converting incoming encrypted/unencrypted IP packets into decrypted/encrypted IP packets, respectively, etc.

U.S. Pat. No. 6,434,145 discloses a method for transferring data between one or more first network ports receiving one or more first data flows and one or more second network ports transmitting one or more second data flows.

The method comprises the following steps:
sending data from one or more first data flows to multiple processing channels;
processing the data in parallel by two or more processing channels;
receiving the data processed by the processing channels, and
sending the processed data to one or more second flows in one or more second ports,
wherein in at least one flow of the first and second flows, data is transferred in frames, and each frame in said one flow is processed by a single one of the processing channels, but at least two frames in said one flow are processed by two different processing channels.

Data received in each first data flow is transmitted to a respective second data flow in the same order in which the data was received in the first data flow.

Each frame received from the first flow is provided, before being sent to a processing channel for processing, with additional attributes (data) including at least:
a frame number in the first flow, and
an identification of the channel to which the frame is sent.

To ensure correct ordering of processed frames, a memory stack is organized according to the first-in-first-out (FIFO) principle in a corresponding second flow so that channel identifications for the processing channels to which the frames are sent from the first flow are stored in the stack.

Therefore, when the processed frame received from the processing channel is sent to a second flow, this is done in same order as the order of channel identifications in the FIFO stack.

It should be noted that the description of the above method uses a unique terminology according to which, in particular, the term "frame" refers to a discrete set of digital data of a particular format that corresponds to a common protocol (ATM, IP, etc.).

This method is implemented in a system comprising:
a first section for sending data from one or more first data flows to multiple processing channels, wherein, in at least one flow of the first and second flows, data is transferred in frames, wherein the first section is configured to send each frame only to one of the processing channels, and to send at least two different frames to two different processing channels;
multiple processing channels, each comprising an individual processor;
a second section for receiving data processed by the processing channels, and sending the processed data to one or more second flows into one or more second ports;
an ordering section for providing the second section with channel identifications for each processing channel to which a frame is sent by the first section,
wherein the second section is adapted to receive the channel identifications from the control ordering section in the same order in which the respective frames are arranged in at least one first flow;
wherein, when the second section receives a channel identification, the second section sends a frame from a corresponding processing channel into the second flow, so that the frames are sent into at least one second flow from the processing channels in the order defined by the channel identifications.

The method provides for processing frames of both fixed and variable size. Generally, even when a fixed size frame is processed by a predetermined algorithm, processing time of individual frames may vary due to various factors (varying operation speed of individual channels, different memory access time, etc.). Therefore, a situation may occur when a current frame of the first flow has been already processed in a processing channel, but cannot be transmitted to the system output, because the previous frame followed by the current frame has not been processed and passed to the output in the second flow yet. In this situation, the system waits until the processing ends and outputs the previous frame first and then the current frame to ensure correct ordering of the frames.

The delays may be even more significant in processing of variable size frames. Such delays impair the system performance, which is a disadvantage of the known method.

US 2002/0107903 discloses another method of providing operation of a network system for parallel processing of data streams, wherein the system comprises:
a first section adapted for
receiving incoming data streams from external network connections;
dividing the incoming data streams into portions;
providing attributes to each portion of each incoming data stream;
sending portions of each incoming data stream to processor units for processing;
a plurality of processor units, each of the processing units including a processor and a buffer memory for storing processed portions of incoming data streams, and providing:
processing portions of incoming data streams by a predetermined algorithm;
sending the processed portions of incoming data streams to corresponding output data streams;

storing the processed portions of the incoming data streams in the buffer memory until conditions occur for sending these portions to a corresponding output data stream;

a second section adapted for receiving the processed portions of the incoming data streams;

forming and modifying output queues containing output processing tokens, the number of output queues matching the number of output data streams;

transferring the processed portions of the incoming data streams in the form of the corresponding output data streams to an external network;

wherein the first section is associated with a plurality of processor units and the second section, and the processor units are further associated with the second section.

An embodiment of the method comprises:

receiving incoming data streams from network connections in the first section;

specifying a required match between the incoming data streams and output data streams;

generating output stream queues in a second section, the number of the queues matching the number of the output data streams;

generating, in each processor unit, output queues of the processor units, the number of said queues matching the number of the output data streams;

sending portions of the incoming data streams for processing to the processor units, wherein each portion of each input data stream is provided with attributes including:

an identifier of the processor unit to which the portion of the input stream is sent;

an identifier of the incoming stream;

placing the identifier of the processor unit, to which the next portion of the incoming data stream has been sent for processing, to the output queue of the second section that corresponds to the specified output stream and includes an output processing token;

processing the portions of the incoming data streams in the processor units to obtain respective portions of output data streams;

writing the identifier of the processor unit, in which processing of a portion of a specified input data stream has been completed, to the output queue of said processor unit that corresponds to the specified output stream;

providing a sequence of portions of the output data streams from the processor units, said sequence corresponding to the sequence of portions of the input data streams, said providing of the correct sequence including:

comparing the identifier of the processor unit, in which processing of a portion of the first stream has been completed, with a correct next identifier of the processor unit in the output processing token, and when the compared identifiers do not match:

storing the processed portion of the first stream in the buffer memory of said processor unit;

writing the processor unit identifier into the output queue of said processor unit;

processing the next portion of the incoming data stream in the processor unit; when the compared identifiers match:

sending portions of the output data streams from the processor units to the second section for generating the output data streams in which the sequence of the portions matches the sequence of portions of the respective incoming streams, and after sending the next processed portion of the first stream, modifying in each processor unit the identifier of said processor unit in the processor unit output queue for the respective output stream and in the output processing token of the respective output stream.

The known method provides for processing both fixed- and variable-size portions of incoming data streams (network packets).

Here, in processing portions of an incoming data stream by a predetermined algorithm the processing time of individual portions may differ due to various factors (varying operation speed of individual processor units, different memory access time, etc.). Therefore, a situation may arise where a separate portion of the incoming stream has been already processed in some processor unit, but cannot be immediately delivered to the output of the system, since the previous portion of the incoming stream has not been processed yet.

In order to provide the sequence of portions of the output data stream precisely matching the sequence of portions of the respective incoming data stream, a specially generated queue is used the first element of which (the output processing token) is the identifier of the processor unit from which the next processed portion of the incoming data stream is to enter the output data stream.

The identifier can be an integer, a memory address, an array index, etc.

After sending a portion of the incoming data streams for processing, the identifier of the processor unit, to which the next portion of the incoming data stream has been sent for processing, is placed into the output queue of the second section stream that corresponds to the specified output stream and contains output processing token, wherein before writing the processor unit identifier, access to the output queue is locked, thereby providing exclusive write access from said processor unit (and disabling writing by any other processor unit);

the identifier is written by performing atomic operations, and then the access is unlocked.

After the end of processing a portion of the incoming data stream in some processor unit, the processor unit identifier is checked for match to the correct identifier from the output processing token.

Where the compared identifiers match, the processed portion of the incoming data stream is transferred to the system output in the second section, and the output processing token is updated by removing the number of said processor unit from its queue.

Where said numbers do not match, the processed portion of the first stream is stored in the buffer memory of said processor unit, and the processor unit identifier is stored in the processor unit output queue organized in the FIFO memory stack format.

Then, the processor unit stops and continuously checks the number of said processor unit and the correct number from the output processing token until said numbers match.

According to a preferred embodiment of the method, if the numbers do not match, the processor unit receives from the first section a new portion of the incoming data stream and processes it. After the end of processing of the new portion of the incoming data stream, the identifier from the output queue stack of the processor unit is again checked for match to the correct number from the output processing token.

If said numbers match, the processed portion of the incoming data stream is transferred from the buffer memory of said processor unit to the system output in the second section, and the output processing token is updated by removing the number of said processor unit from its queue.

The output queue stack of said processor unit is also updated by removing from it the identifier of the processor unit that has transferred the processed portion of the incoming data stream to the output.

A disadvantage of the known method is that even its preferred embodiment has low efficiency due to the delay caused by checking the identifier of a particular processor unit and the correct number from the output processing token until said numbers match, since, if no match has occurred, the next check will be performed only after processing a new portion of the incoming data stream.

SUMMARY

The advantage provided by the present disclosure relates to the improved efficiency of processing incoming streams by eliminating the time of waiting for the end of processing of the next portion of the incoming data stream in the cases when the preceding portions have been already processed.

To this end, a method is provided for parallel processing of ordered data streams in a computer system comprising:
  a first section adapted for
    receiving incoming data streams from external network connections;
    dividing the incoming data streams into portions;
    providing attributes to each portion of each incoming data stream;
    transferring portions of each incoming data stream to processor units for processing;
  a plurality of processor units, wherein each processor unit comprises a processor and
  means for storing processed portions of incoming data streams and is adapted for
    processing portions of incoming data streams by a predetermined algorithm;
    transferring the processed portions of the incoming data streams to respective output data streams;
    storing the processed portions of the incoming data streams until conditions occur for sending the portions to the respective output data stream;
    transferring the processed portions of the incoming data streams to other processor units;
    receiving the processed portions of the incoming data streams from the other processor units;
    searching for specified elements in the attributes of the portions of the incoming data streams;
  wherein the first section is associated with the plurality of processor units;
  the method comprising the steps of:
    receiving incoming data streams from network connections in the first section;
    transferring portions of the incoming data streams for processing to the processor units, wherein each portion of each incoming data stream is provided with attributes including:
      an identifier of the incoming stream;
      an identifier of a position of said portion in the incoming stream;
    processing the portions of the incoming data streams in the processor units to obtain respective portions of output data streams;
    providing a sequence of portions of the output data streams from the processor units, said sequence corresponding to the sequence of portions of the incoming data streams, said providing of the sequence including:
      searching for a processor unit which is processing a portion of a particular incoming data stream, said portion located in a particular first stream before a portion already processed in said processor unit, and
    if several processor units are found in the search:
      selecting a processor unit which is processing the portion of the particular incoming data stream that is closest to the processed portion of the particular incoming stream;
      transferring the processed portion of the particular incoming data stream from said processor unit to the selected processor unit, as well as the processed portions of the incoming data stream that have been previously received from the other processor units, if any;
    if no processor units have been found in the search:
      transferring the processed portions of the incoming data stream to a respective output data stream in which the sequence of portions corresponds to the sequence of portions in the respective input stream, with account of processed portions of the incoming data stream that have been previously received from other processor units.

Therefore, in contrast to the known method, no delay occurs in the present method after the end of processing of a portion a particular incoming data stream, and the processed portion of the incoming data stream is transferred from the considered processor unit to the selected processor unit. After transferring the processed portion, the considered processor unit immediately receives for processing a next portion of some incoming data stream and starts processing it.

It can be further noted that such a next portion may belong to another incoming data stream different from the particular incoming stream to which the previously processed and transmitted portion belonged. Such a capability is lacking in the method according to the known art, since it uses processor unit identifiers that are ultimately bound to some single incoming data stream until the end of processing thereof, and this also impairs the system performance.

EMBODIMENTS OF THE DISCLOSURE

Figure 1:
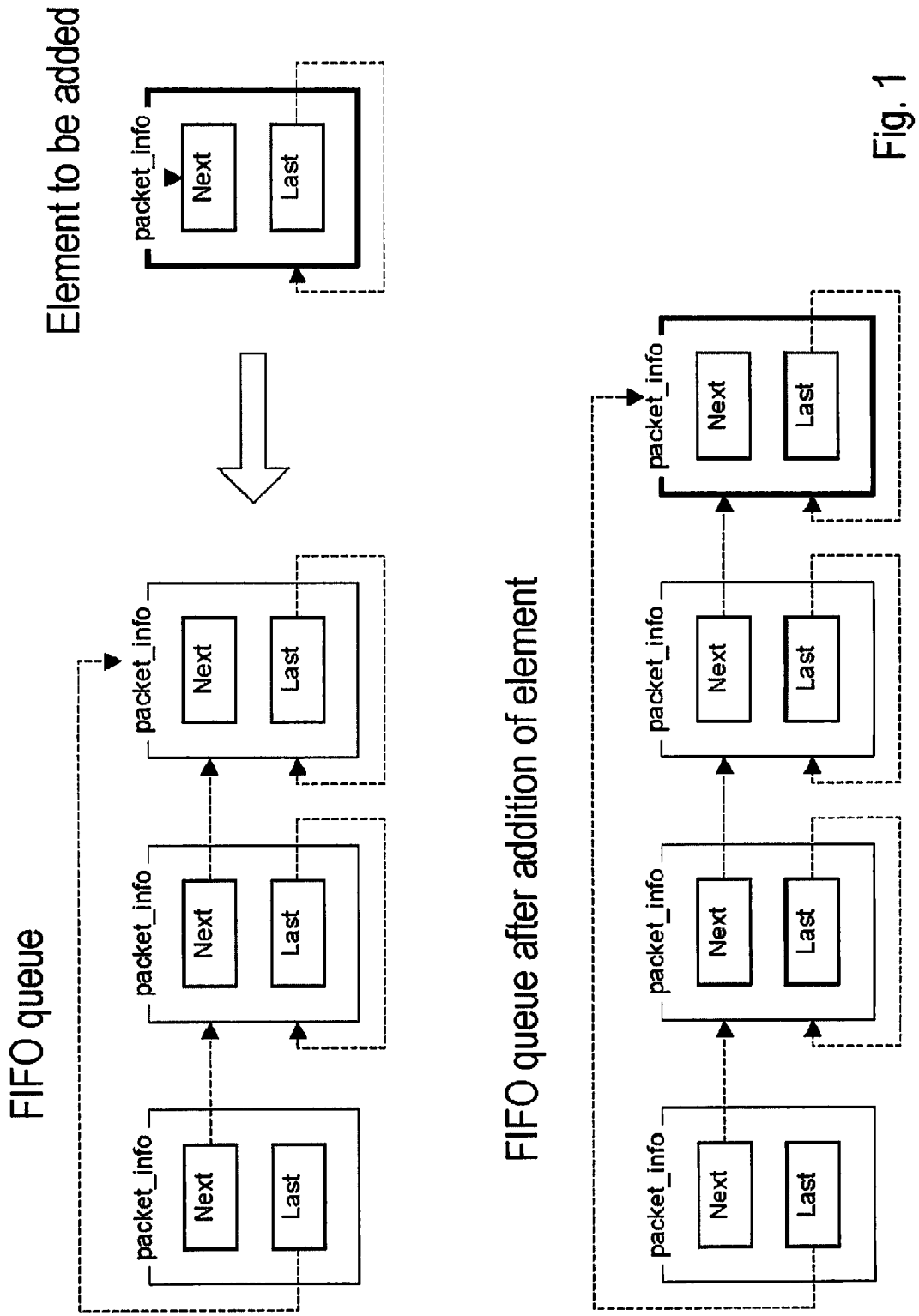
FIG. 1 shows a schematic diagram explaining the principle of forming the FIFO queue using the attributes Next and Last of the data structure packets_info.

Let us consider an exemplary embodiment of the present method in a network router configured as a multiprocessor computing system designed to convert multiple incoming data streams received from an external communication network (e.g. network data packets from Internet) into a plurality of output data streams transmitted e.g. to an internal enterprise network.

For definiteness, let us consider incoming data streams comprising a sequence of data packets formed by TCP/IP protocol and encrypted using some standard (e.g. DES) with known parameters.

The task of the router is to decrypt the incoming data streams and transmit them to an internal data network to consumers (common users).

To receive the incoming data streams, the router comprises:
a plurality of network interfaces for receiving and transmitting network data packets;
a plurality of processor units, each being a general purpose processor (e.g. x86- or ARM-based) for processing received packets;
random access memory (RAM) for storing received network packets and information necessary for operation of the system.

The architecture of general purpose processors must support the following types of operations:
the atomic (non-interruptible) memory-read operation followed by writing a new value (hereinafter referred to as AtomicExchange), e.g. the processor command "xchg" in the x86 architecture;
the atomic (non-interruptible) memory-read operation followed by writing the read value incremented by a specified value (hereinafter referred to as AtomicAdd), e.g. the processor command "lock xchgadd" in the x86 architecture.

The router is controlled by an operating system (OS) that is capable of operating in a multi-processor configuration (e.g. Linux OS).

In order to implement the present method, each processor unit is adapted to perform the following additional functions which are missing in the known art:
transferring processed portions of incoming data streams to other processor units;
receiving processed portions of incoming data streams from other processor units;
searching for specified elements in attributes of portions of incoming data streams.

Each processor unit provides transfer of processed portions of incoming data streams to corresponding output data streams. Direct data transfer to the internal network can be implemented using one or more network interface cards connected to the internal network.

The functions required to implement the present method should be provided by application software which may be developed by a programmer based on information about the intended purpose of said functions.

Operating system components that control network interfaces (network interface drivers) place received network packets into RAM. In addition to each received packet, the driver generates in RAM a special data structure (hereinafter referred to as packet_info) which consists of the following fields (attributes):
the address of the data packet from a particular incoming data stream in RAM;
the address of the next data packet from a predetermined incoming data stream in the queue (sequence) of packets (hereinafter referred to as Next);
the address of the last data packet in the queue (sequence) of packets (hereinafter referred to as Last).

The attributes Last and Next are used to form a queue of received packets according to the FIFO scheme. The last data packet in the queue has "0" (zero) in the field Next.

FIG. 1 shows the principle of forming a FIFO queue using these fields.

After copying a packet to memory, the driver adds the associated packet_info structure to the FIFO queue of received packets. Access to the queue is synchronized by a standard OS function (the synchronization primitive, for example, spinlock in Linux OS) that provides exclusive access to a synchronized object (for example, a memory cell). Said primitive operates in the following way: to gain access to the object, the OS component should "capture" the primitive, and then it can modify the object and "release" the primitive thereafter.

Packets are processed in processing program threads of the operating system (e.g. kernel threads in Linux OS), wherein the number of program threads does not exceed the number of processor units in the system, and each program thread is executed in one processor unit only.

Each program thread has two states:
"busy" in which it performs processing of a network packet and actions to preserve the sequence of packets;
"free" in which it waits for a new packet to be processed, at this time the thread is not executed by its processor unit.

Waiting by the program thread for a new packet to be processed can be implemented using a standard OS synchronization mechanism, e.g. waiting on the semaphore synchronization primitive in Linux OS.

The number of program threads in a particular state is stored in RAM in the form of a special data structure (hereinafter referred to as threads_info). Access to this structure is also synchronized by the FIFO queue synchronization primitive.

After adding packet_info to the queue of received packets, the network interface driver determines from data of the structure threads_info whether a processing program thread in the "free" state is currently available. If such a program thread is available, the driver uses the appropriate OS synchronization primitive mechanism to activate the program thread.

To process a network packet, the program thread uses a special structure (hereinafter referred to as Descriptor) which stores all information necessary to perform required actions on the network packet and send the packet to the output of the system.

Each program thread has its own fixed set of the Descriptor structures reserved in RAM. The number of the structures in the set of each program thread equals the number of program threads in the system. This ensures that the program thread will always have a free Descriptor structure to handle a new packet.

The Descriptor structure may be in three states:
"busy" in which it is used to process a packet;
"free" in which it can be used by the program thread to process a new packet;
"busy" to "free" transition state in which a packet has been processed, but the structure cannot still be used to process a new packet.

The Descriptor structure states are controlled by a special software mechanism of counting references to an object and additional flags which will be described below.

The Descriptor structure consists of the fields shown in Table 1.

TABLE 1

| Notation | Type | Designation |
| --- | --- | --- |
| state | reference | Defines the state of the Descriptor structure |
| id | numeral | The identifier of the incoming network stream from which the packet described by the Descriptor structure is taken |
| order_id | unsigned integer | The serial number of a packet in the incoming network stream; packet A is considered to be located in the incoming network stream before packet B if the difference between serial numbers, represented by a signed integer, is negative |
| predecessor_value | address | The address of the Descriptor structure which describes a packet ("predecessor") located in the incoming network data stream before the processed packet |
| predecessor_state | reference | The reference for synchronizing access to the field predecessor_value |
| packets_list | address | The address of the first element in the queue consisting of packet_info structures; the queue is used to transfer packets between program threads in course of determining the flow sequence of packets to the system output; along with the packet_info address the field stores two flags: Predesessor_Ref and Successor_Ref |
| stop | numeral | The indication that Descriptor is "busy" |
| free | numeral | The indication that Descriptor is "free" |

The Descriptor structure transitions to the "free" state only when the reference State has transited to the object modification state, therefore, the "free" reference State is in the modification state.

With the "busy" Descriptor structure, the reference State is in the state of shared access to the object.

Receiving a Network Packet by a Program Thread for Processing

Upon activation by the driver or upon completion of packet processing, the program thread gets access to the queue of received packets by "capturing" the synchronization primitive and takes the first packet from the queue.

If there are no packets for processing, the program thread releases the synchronization primitive, transitions to the "free" state and waits for activation on the respective OS synchronization primitive.

If a packet for processing is available, then, upon extraction of the packet from the queue, the program thread generates an identifier of the incoming network data stream to which the packet belongs, using a network interface number in the OS, a network layer protocol type, and information from the network layer header (e.g., information from the IP header such as source and destination IP addresses, the transport protocol type). Then, the packet is assigned a serial number which indicates its position in the incoming data stream. The stream ID and the serial number are stored by the program thread in RAM in the Descriptor structure the address of which is recorded in the variable free_descriptor. Every program thread has its own variable free_descriptor. This variable always stores, at the time of reception of a packet to be processed, the address of a "free" Descriptor structure from the set of Descriptor structures of the program thread.

After filling the respective fields, the program thread translates the Descriptor structure to the "busy" state (the reference State to the shared mode). Then, the Descriptor structure address is written in the current_descriptor variable in RAM. Each program thread has its own associated variable current_descriptor.

Then, the program thread releases the queue synchronization primitive, and after that it is considered to be "busy". The program thread proceeds to processing the packet (decrypting by a predetermined algorithm; additional steps for routing, applying filtering rules, etc. are possible).

Transferring a Packet to the System Output

After processing, in order to determine the correct flow sequence of the packet to the output of the system (an appropriate network interface), the program thread searches for the "predecessor" among the packets currently processed by other program threads.

"Predecessor" is a packet from the same incoming network data stream as the packet processed by the program thread, but located before it in the incoming network stream, i.e. having a less serial number.

The Descriptor structure comprises the field predecessor_value which contains the address of the Descriptor structure used by the program thread that is processing the found "predecessor". Access of other program threads to the field predecessor_value is synchronized by the reference counting mechanism. For this purpose, Descriptor has the field predecessor_state of Reference type.

Transmission of a packet to the output of the system depends on availability of the "predecessor".

If no "predecessor" has been found, it means that all packets from a particular incoming network stream up to the current processed packet have been already transmitted to the system output, so the processed packet is transferred to the system output (to the network interface driver for sending).

If the "predecessor" has been found, the program thread adds the packet (a list packets in general case, see below) to the packet queue packets_list in the Descriptor data structure of the "predecessor". In course of adding, the program thread checks the state indications in the "predecessor" Descriptor structure. If the indications show the "busy" state, then the packet is successfully added to its queue. Now transmission of the packet to the system output will be performed by the program thread processing the "predecessor".

If the "predecessor" is in the transition state (it cannot be in the "busy" state, because the program thread adding the packet (packet list) holds the reference to it), the addition fails. In this case, if the "predecessor" has packets in the queue, the program thread forms a new list of packets from these packets and its own packet (packet list).

Then, the program thread searches for a "busy" "predecessor" using the field predecessor_value in the Descriptor structure of the "predecessor". If the search is successful, the found "predecessor" is used to transfer packets to it, as described above. If no "predecessor" is found, the program thread transfers the list of packets to the system output (to drivers of respective network interfaces).

After transferring the list of packets to output of the system (by the algorithm described above), the program thread checks the packet queue in its Descriptor structure (the variable current_descriptor). If the program thread discovers during the check that the queue is empty or that another program thread is trying to add packets for sending at the moment, the program thread sets the transition state indication of its Descriptor structure and proceeds to reception of the next packet. Otherwise, the program thread receives all packets from the queue and transfers them by the algorithm described above.

Figure 2:
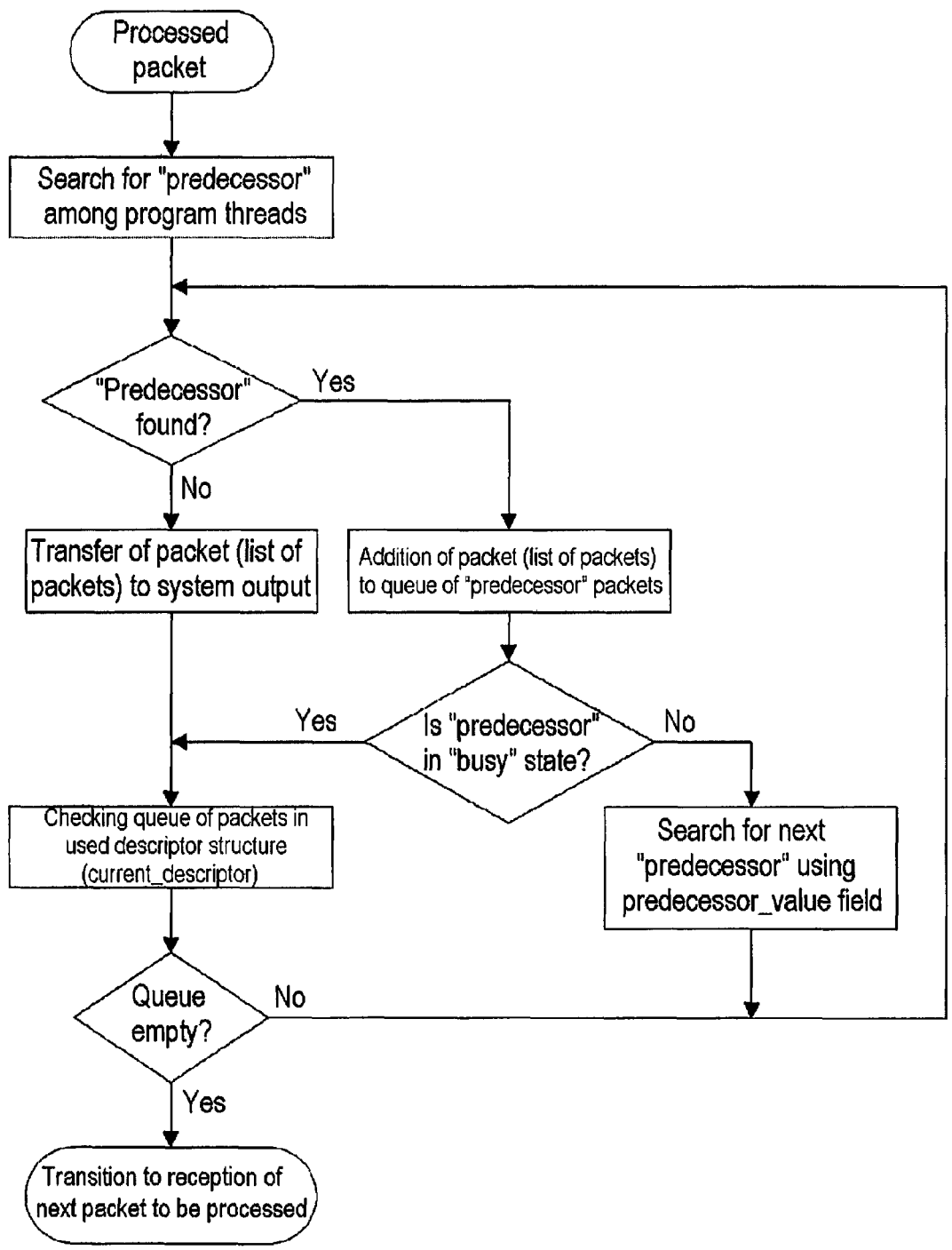
FIG. 2 shows a general algorithm of transferring a processed packet to the output of the system.

FIG. 2 is a flow chart illustrating how packets are transferred to the system output.

Searching for the "Predecessor" Among Processed Packets

The program thread searches for the "predecessor" by alternately analyzing the variables current_descriptor of other program threads (hereinafter referred to as Descr) and comparing values of the incoming network stream identifier and the processed packet serial number with the same parameters from its current_descriptor (hereinafter referred to as Current).

Prior to performing comparison, the program thread receives the reference descr.state, thereby locking transition of that Descriptor structure to the free state (for reuse).

If Descr is the first found descriptor that meets the "predecessor" requirements, then the program thread attempts to get its predecessor_state reference. If the attempt is successful, the address of Descr is stored as the "predecessor candidate" (the variable Pred). The obtained descr.predecessor_state reference ensures that in the "busy" to "free" transition state of Descr the value of descr.predecessor_value will be preserved as long as Current keeps said reference (Descr cannot transit to the "free" state, since the program thread has previously received its descr.state reference).

If Descr is the first found Descriptor structure satisfying the above requirements, the program thread receives the reference descr.predecessor_state and, if successful, Descr is stored as the "predecessor candidate".

If the "predecessor candidate" has been already found in the previous search iterations, then the serial numbers of Descr and "predecessor candidate" are compared to determine which of them is "closer" to Current.

If Descr is closer, the program thread receives the reference descr.predecessor_state and, if successful, stores Descr as the "predecessor candidate", while the references of the former "predecessor candidate" are released.

As a result of successful search, the last found "predecessor candidate" will be regarded as "predecessor", its address will be stored in current_descriptor.predecessor_value, and the program thread will transfer its processed packet thereto so that the "predecessor" program thread sends said packet to the system output after its own packet.

Figure 3:
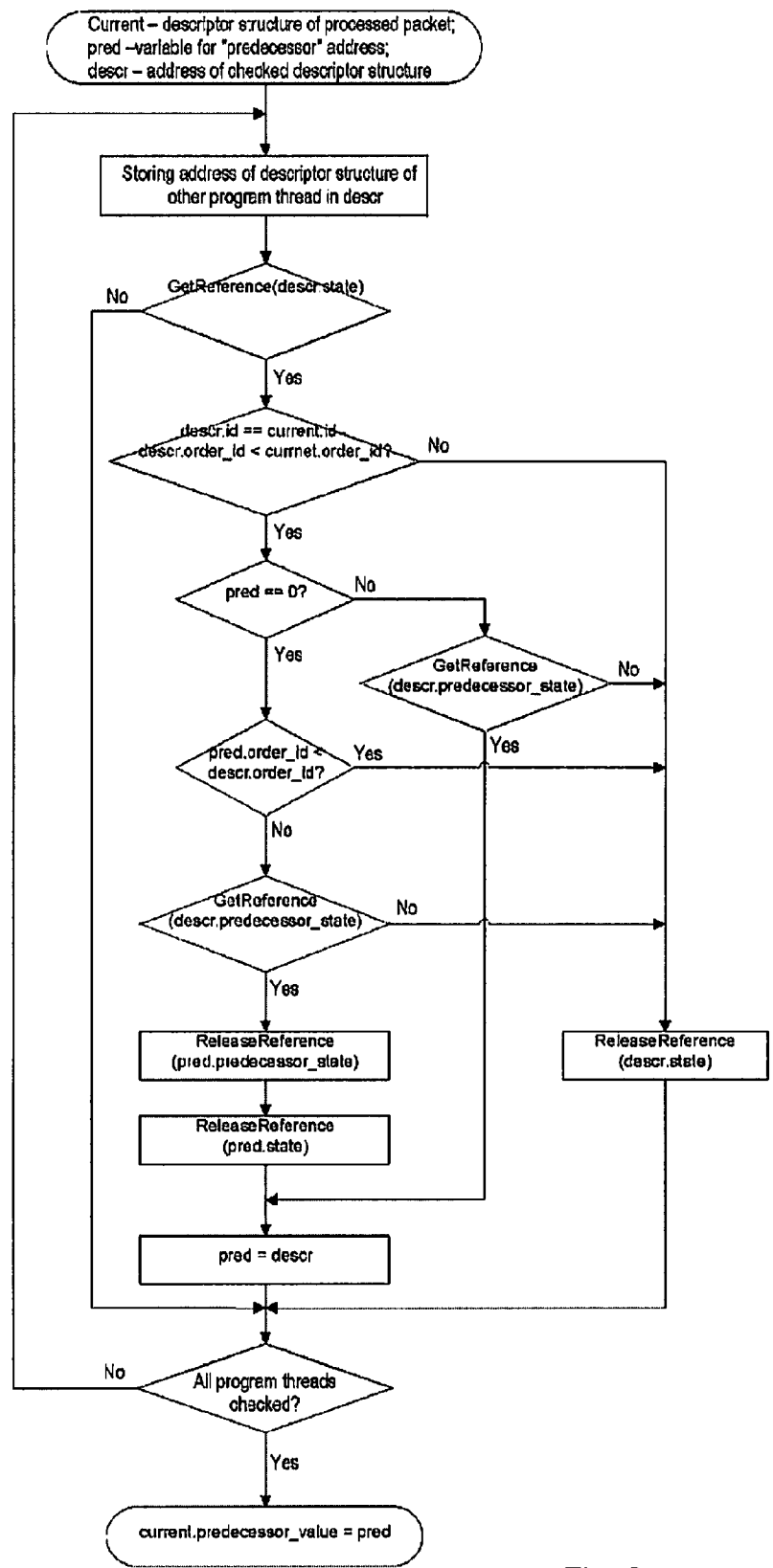
FIG. 3 shows the algorithm of searching for the "predecessor" among processed packets.

FIG. 3 is a flow chart illustrating the process of searching for the "predecessor" among processed packets.

Transferring Packets to the "Predecessor"

To transfer a packet to the "predecessor", the fields of the respective packet_info structure are used to form a queue of packets. For this purpose, the Descriptor structure has the field packets_list which stores the address of the first packet_info structure in the queue (the first element of the queue).

The field Stop in the "predecessor"'s Descriptor structure is checked. If said filed is set to "1", this means that the Descriptor structure is transitioning from the "busy" state to the "free" state, and, hence, cannot be used as the "predecessor" to transmit the processed packet. In this case, a new predecessor search is to be performed by sequentially analyzing the list of "predecessors" with the predecessor_value field of the current "predecessor" taken as the beginning of the list.

In order to transfer a packet (a list of packets in general case) to the "predecessor", the program thread writes, using AtomicExchange, the flag Successor_ref to the field packets_list of the "predecessor". Then, the thread forms a new queue of its packet (list of packets) and the queue stored in packets_list of the "predecessor".

If the program thread detects that the flag Predecessor_ref has been set in the "predecessor"'s packets_list, i.e. the "predecessor" is now checking its packets_list field for new packets, the program thread considers it to be in transition from the "busy" state to the "free" state.

If the flag Predecessor_ref is not set, the program thread writes the address of the first packets_info structure of the formed queue into the "predecessor"'s packets_list using AtomicExchange. If the flag Predecessor_ref has been already set to this instant (the value of packets_list returned by the function AtomicExchange is analyzed), the program thread considers that the "predecessor" is in the transition state.

If the flag is not set, this means that the packet (list of packets) has been successfully passed to the "predecessor", and the program thread can proceed to checking its packets_list field to receive new packets for transmission to the output of the system from their "successors".

If the program thread has failed to add the packet (list of packets) to the queue (the "predecessor" is in the transition state), it writes "1" to the "predecessor"'s Stop field and searches for the "predecessor" using the predecessor_value field of the current "predecessor" Pred.

Figure 4:
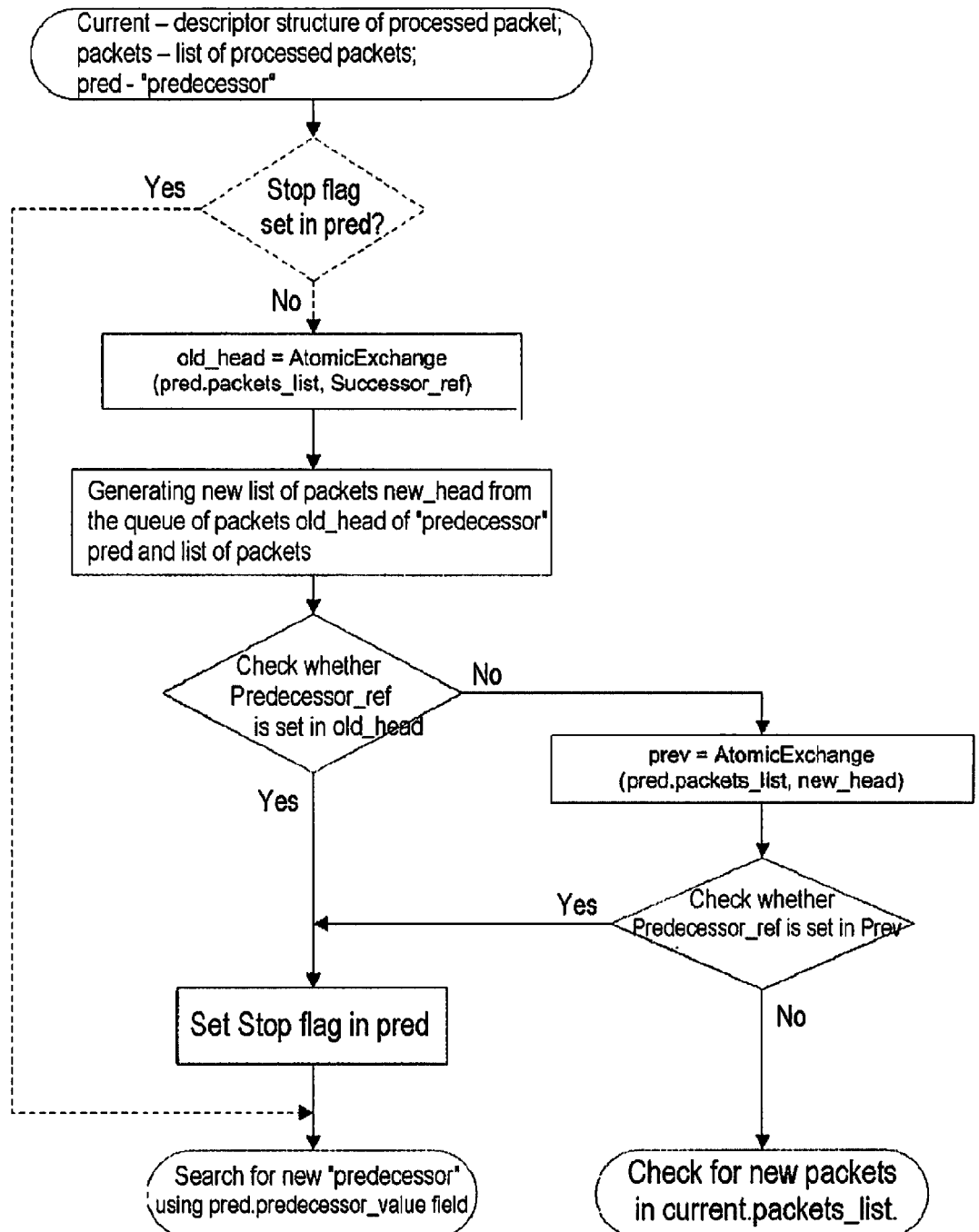
FIG. 4 shows the algorithm of transferring a list of processed packets by the program thread to its current "predecessor".

FIG. 4 is a flow chart illustrating how a list of processed packets is transferred by the program thread to its current "predecessor".

Receiving Packets from "Successors" to Transfer to the System Output

Using the function AtomicAdd, the thread sets the flag Predecessor_ref in current_descriptor.packets_list.

If the value returned by the function AtomicAdd comprises "0" as the address of the beginning (the first element) of the queue, this means that the queue is empty, and the current_descriptor structure is now in the "transition" state (for the "successors" this is indicated by the flag Predecessor_ref set by the function AtomicAdd).

If the function AtomicAdd returns a value in which the flag Successor_ref is set, then the "successor" is adding packets to the current_descriptor queue at this instant. Accordingly, the "successor" will detect the flag Predecessor_ref, when it adds a new list of packets. Thus, the "successor" will determine that the current_descriptor structure is in the transition state and will search for another "predecessor".

If the flag Successor_ref is not set and the queue is not empty, the program thread extracts from the returned value the address of the first packet_info element of the queue and then writes (by calling the function AtomicExchange) "0" to packet_list of the descriptor.

If by that moment the "successor" has started adding its assignments, then the flag Successor_ref will be set in the return value of the function AtomicExchange. In this case it is also considered that current_descriptor has changed to the transition state.

If the flag Successor_ref is not set, then the program thread has completed checking the queue and can transmit the received packets to the system output using the "predecessor" (as described above) or, if there is no "predecessor", the program thread itself transmits packets to the respective output network interfaces (using the OS software interface for transmitting packets).

If after checking the packet queue the current_descriptor structure has changed to the transition state, the program thread translates the references predecessor_state and state to the "exclusive use request" (by calling the function RequestToDisableSharedMode for each of them), and then the program thread can proceed to selecting the next packet to be processed using another free Descriptor structure from its set.

When the reference predecessor_state transitions to the modification mode as a result of release of all references, the field predecessor_value is checked: if its value is not zero, the references predecessor_state and state of predecessor_value are released.

When the reference State transits to the modification mode as a result of release of all references, the following actions are performed in the Descriptor structure:
- the function EnableSharedMode is executed for the reference predecessor_state;
- "0" is written to packets_list;
- "0" is written to the field Stop;
- "1" is written to the field Free, thereby indicating that the Descriptor structure is "free."

Upon termination of the packet processing (current_descriptor is in the transition state), the thread searches for Descriptor in the free state by analyzing the Free field of all descriptors in the set of the program thread.

Figure 5:
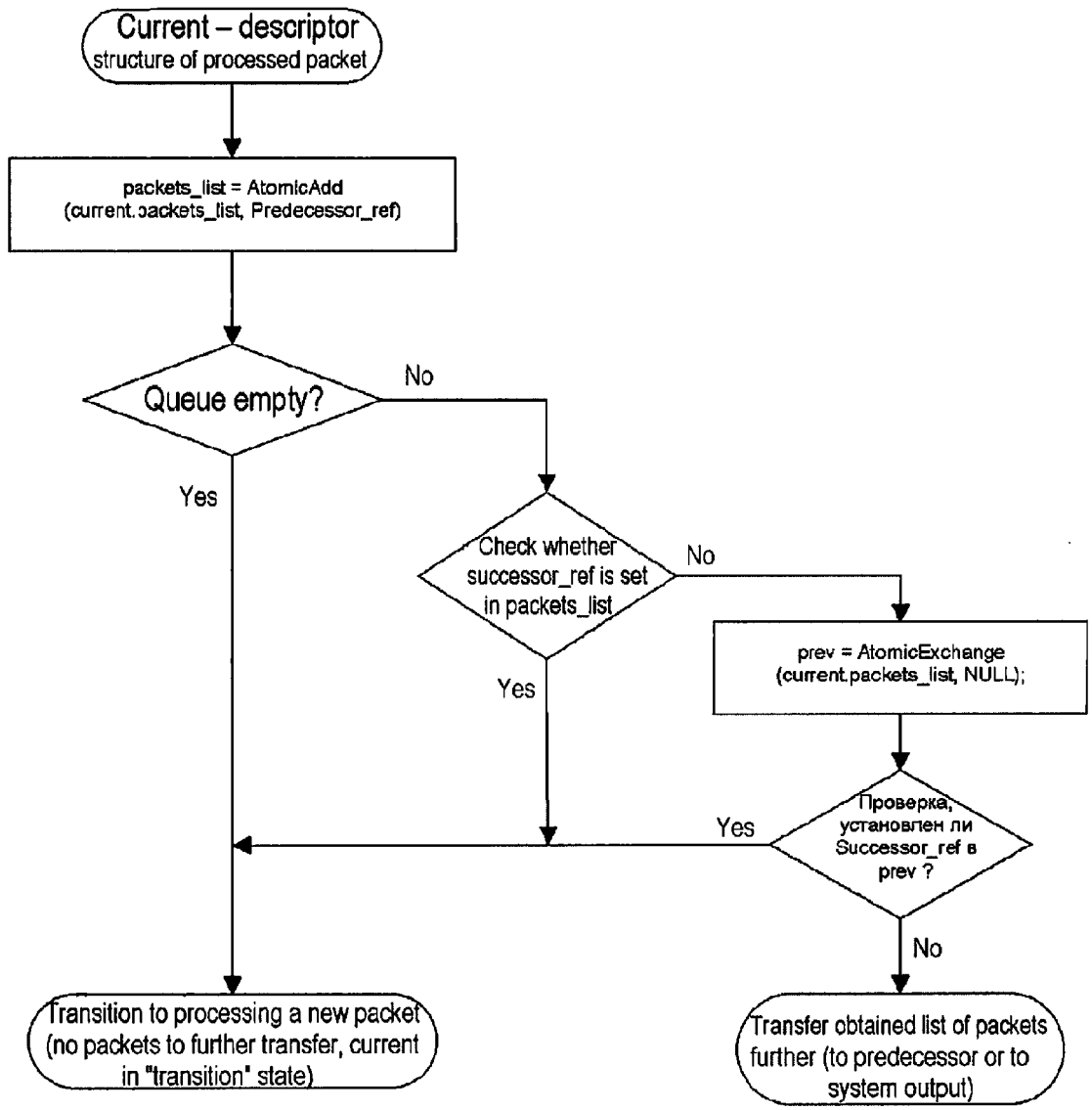
FIG. 5 shows the algorithm of checking the queue of packets received from the "successors" which are to be transferred by the program thread to the system output.

FIG. 5 shows the flow of checking the queue of packets received from "successors" which are to be transferred to the system output by the program thread.

Searching for the "Predecessor" Using the Field Predecessor Value

The program thread receives the address of the next "predecessor" (pred.pdecessor_value) from its "predecessor" (Pred). If the address is not zero and the following conditions are met: the value of pred.stop is not "1" and the program thread has successfully received the references pred.predecessor_state and pred.state, the Descriptor structure becomes the new "predecessor" for the thread, and the search stops.

If the conditions are not met, the next search iteration is performed where the similar steps are performed for the structure the address of which is written in predecessor_value field of the just checked Descriptor structure. The number of search iterations (the size of chain of "predecessors") is limited to the number of threads reduced by 1 (the current thread).

Upon completion of the search, the previous "predecessor" is released: its references predecessor_state and state are respectively unlocked.

If no "predecessor" has been found in the search, the program thread itself transfers packets to the respective output network interfaces.

Figure 6:
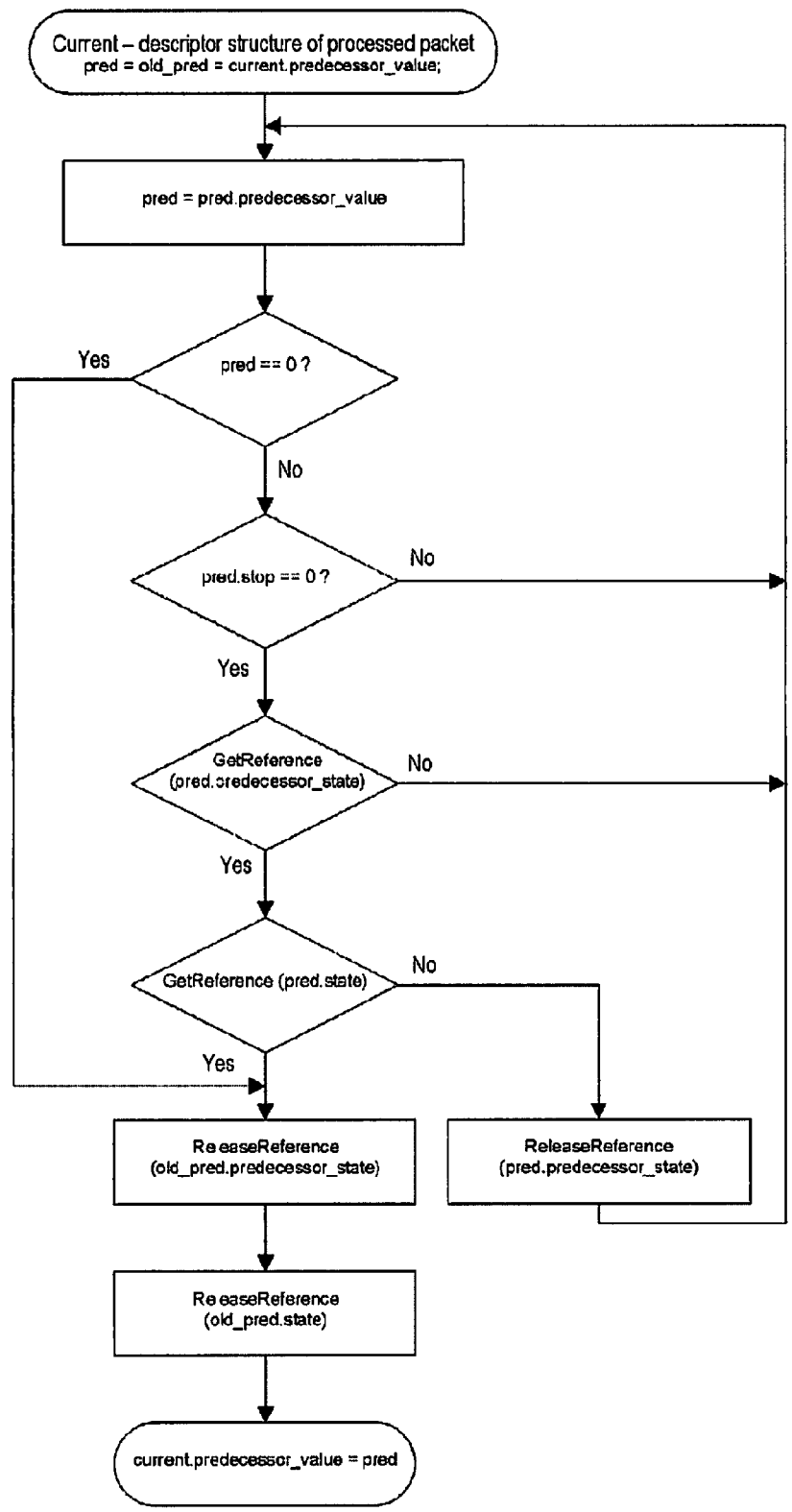
FIG. 6 shows the algorithm of searching for the "predecessor" using the field predecessor_value that is executed by the program thread in scheduling the processed packets for being sent to the system output.

FIG. 6 is a flow chart illustrating how the program thread searches for the "predecessor" using the field predecessor_value to transfer processed packets to the system output.

Searching for the Descriptor Structure in the "Free" State

Upon transition of current_descriptor to the transition state (the program thread has completed all the steps of processing and transferring packets, both processed by itself and obtained from "successors"), the program thread searches for a free Descriptor structure to be used for processing a new packet.

The search is performed by checking the field Free of all the Descriptor structures in the set of the program thread. Since the number of structures in the set corresponds to the number of program threads in the system, and the current program thread does not lock any Descriptor structures in other program threads, then at least one Descriptor structure will be in the "free" state. This fact follows from the above algorithms of searching for the "predecessor" and the reference counting mechanism set forth below.

To implement the present method, a number of auxiliary procedures described below is used.

Mechanism of Counting References to an Object

The life cycle of an object in the system (the object may be, for example, a variable in RAM) that uses the reference counting mechanism (hereinafter referred to as "the mechanism") starts with its initialization (initialization of the respective data of the mechanism, in particular, as part of the object). At this stage, only the object's creator (or owner that may be represented by functions and software units) has access to the object; the other software components of the system (functions and software units) have no information about existence of the object (the object is "not published"). Upon initialization, the object's owner performs the required steps to "publish" the object—from this moment the other software components of the system can attempt to get access to contents of the object.

To allow access to the object, the owner calls the function EnableSharedMode, and the object transitions to the shared state. Now the software components of the system that desire to access the object should get a reference by using the function GetReference of the mechanism. If the reference is successfully got, then it is guaranteed that the object will not transition to the modification state until the reference is released. Thus, this state guarantees read-only access to the object. Upon completion of sharing, the software components of the system should call the function ReleaseReference of the mechanism to release the reference.

In order to exit from the shared mode, one of the software components of the system should call the function RequestToDisableSharedMode which translates the object to the state of waiting for the end of sharing. At this stage, no new references can be got, i.e. GetReference will end unsuccessfully.

After releasing the last reference, the object will transit to the exclusive access state where the system software component that has released the last reference can modify the object. To get back to the shared state, the system software component should call the function EnableSharedMode again.

For destruction of the object the object "publication" should be deleted, thereby ensuring that no program element of the system is able now to access the object in order to get the reference. Then the function RequestToDisableShared- Mode is called. Subsequently, the system software element that has released the last reference can delete the object.

The data required for operation of the reference counting mechanism is presented in the form of the structure Reference.

Figure 7:
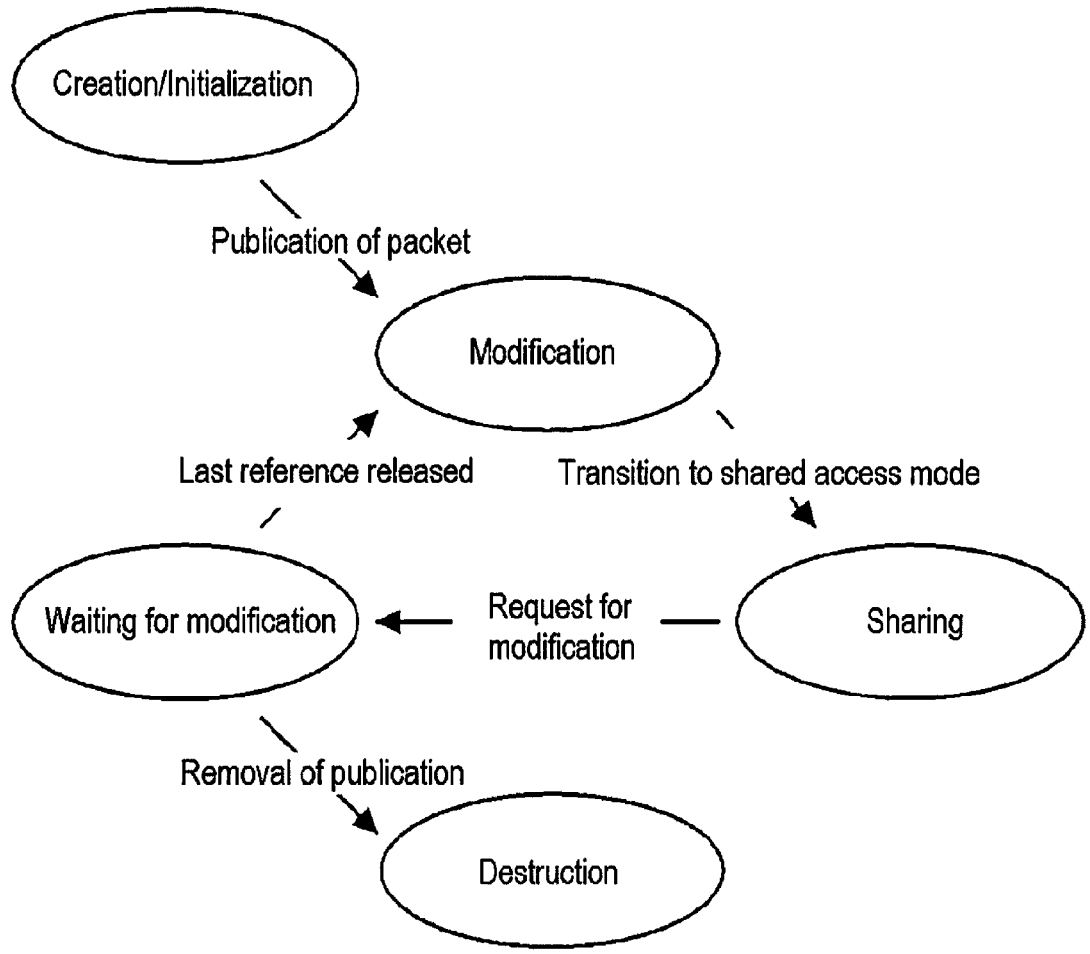
FIG. 7 shows the life cycle of an object, access to which is controlled by the reference counting mechanism.

FIG. 7 shows the life cycle of the object, access to which is controlled by the reference counting mechanism.

Implementation of the Reference Counting Mechanism

The abovementioned reference counting mechanism can be implemented using the aforementioned functions AtomicExchange and AtomicAdd.

In order to implement said mechanism, the data structure is required which consists of the following fields:
the variable Reference which combines the counter of accesses to the object to get the reference (the function GetReference) with the flag Request_To_Release which, if set, indicates that it is forbidden to get new references to the object. The access (reference) counter step is the constant Reference;
the variable release_ref which is the counter of the performed reference release operations and is used in transition to the mode of exclusive access to the object;
release_target representing the number of references to be released to transit to the exclusive access state.

Initialization of the Object

The flag Request_To_Release is set in Reference. In such a way the object is translated to the exclusive access mode and can be "published".

Transition to the Shared Use State (EnableSharedMode)

The variables Release_ref and release_target are set to "0". The object access counter is atomically set to "0", and the flag Request_To_Release is reset, thereby allowing to get references.

Getting a Reference

In order to get a reference, the Reference counter is incremented by one Reference and its previous value is checked. If the flag Request_To_Release has not been set in Reference, the reference is successfully got and the object is in the shared state. If the flag has been set, then the reference is not got and access to the object is not allowed.

Figure 8:
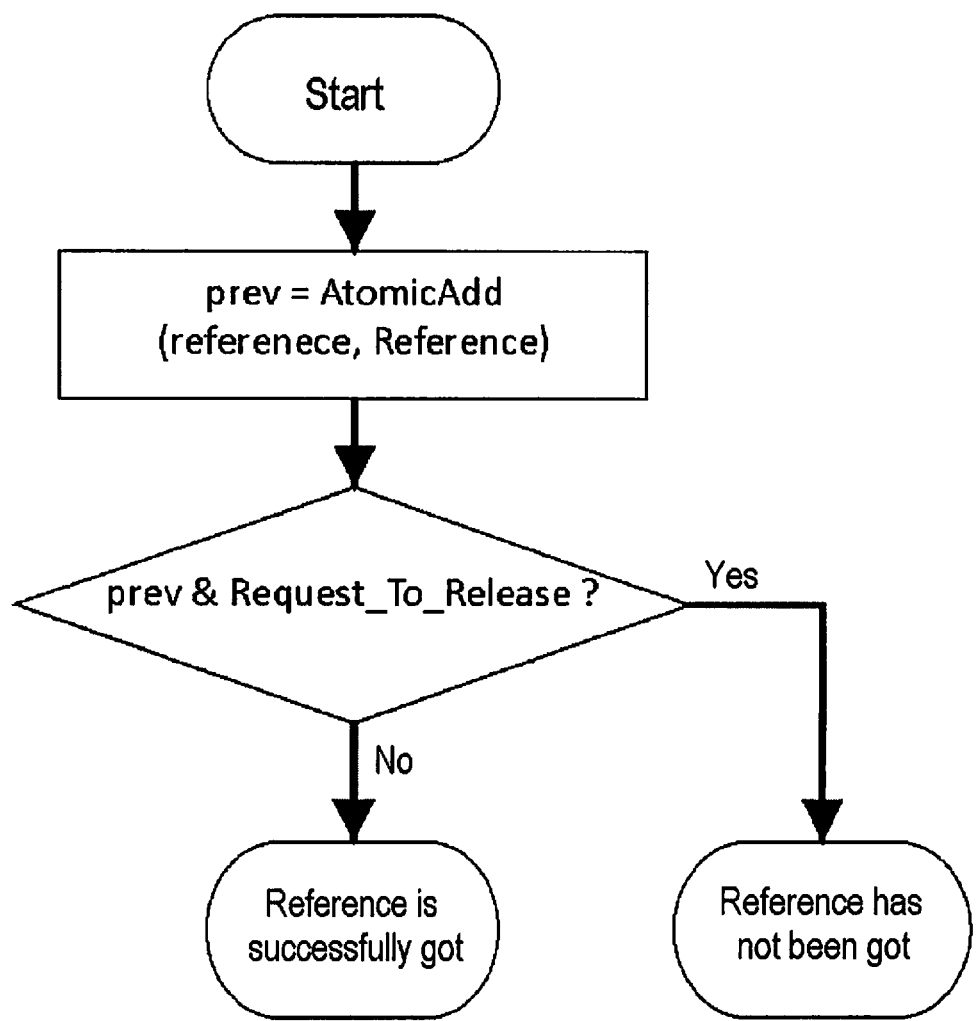
FIG. 8 shows the algorithm of the function GetReference of the reference counting mechanism.

FIG. 8 is a flow chart illustrating operation of the function GetReference for the reference counting mechanism.

Transition to the Modification State

The flag Request_To_Release is set in Reference. If the counter value was "0", then all the references have been already released (or not obtained by anyone at all), and the object transitions to the exclusive access state.

If less than all references have been released to the time of setting the flag Request_To_Release, then the previous value of the reference counter is written in release_target that reflects the number of unreleased references. Then release_ref is incremented by one Reference, and the previous release_ref value obtained as a result of this operation is compared with release_target. If the values are equal, this means that all the references have been released since setting the flag Request_To_Release, and thus the object has transitioned to the exclusive access state.

Figure 9:
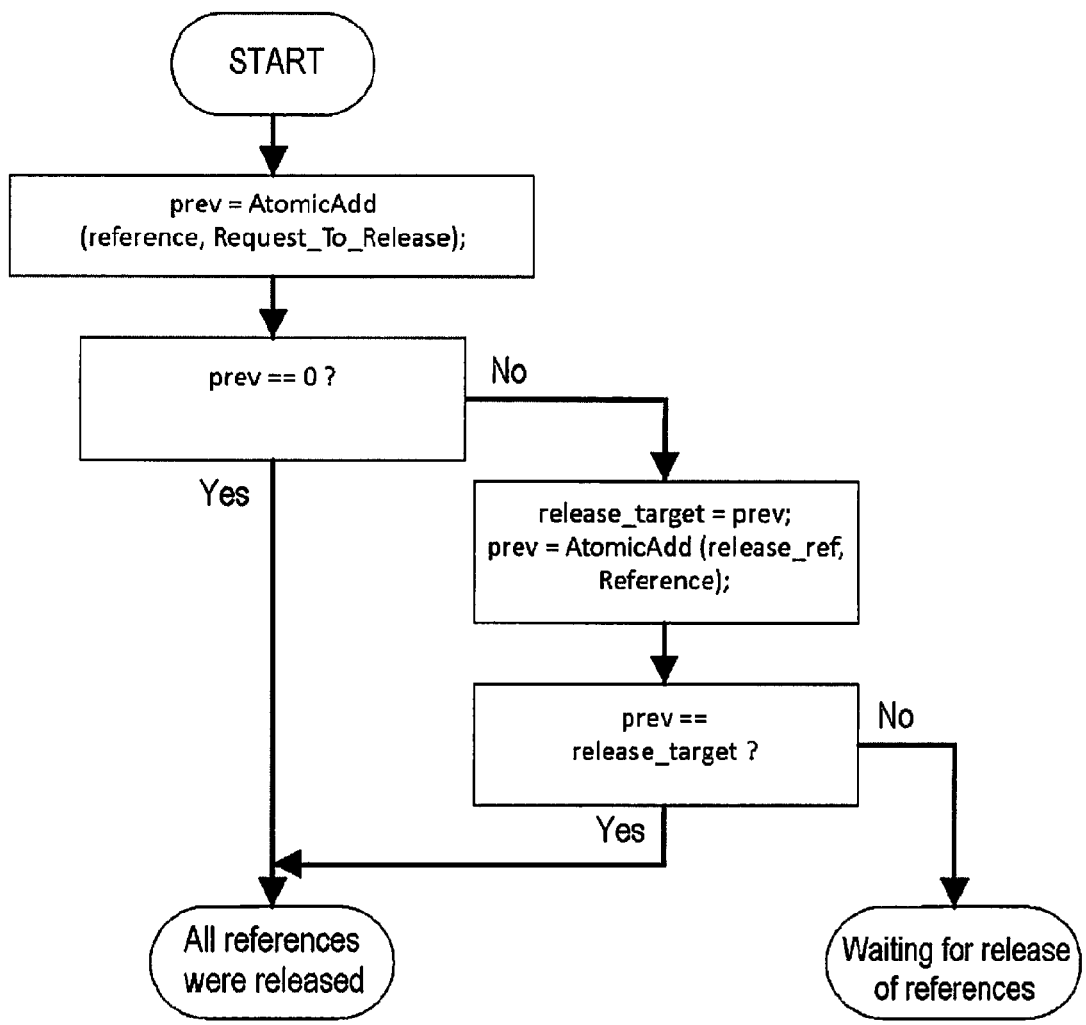
FIG. 9 shows the algorithm of the function RequestToDisableSharedMode of the reference counting mechanism.

FIG. 9 is a flow chart illustrating operation of the function RequestToDisableSharedMode for the reference counting mechanism.

Releasing the Reference

The Reference counter is decremented by one Reference. Then, if the flag Request_To_Release has been set, the release_ref counter is incremented and its previous value (returned by the function AtomicAdd) is compared with release_target. If the values match, the object transitions to the exclusive access state (the last reference was released).

Figure 10:
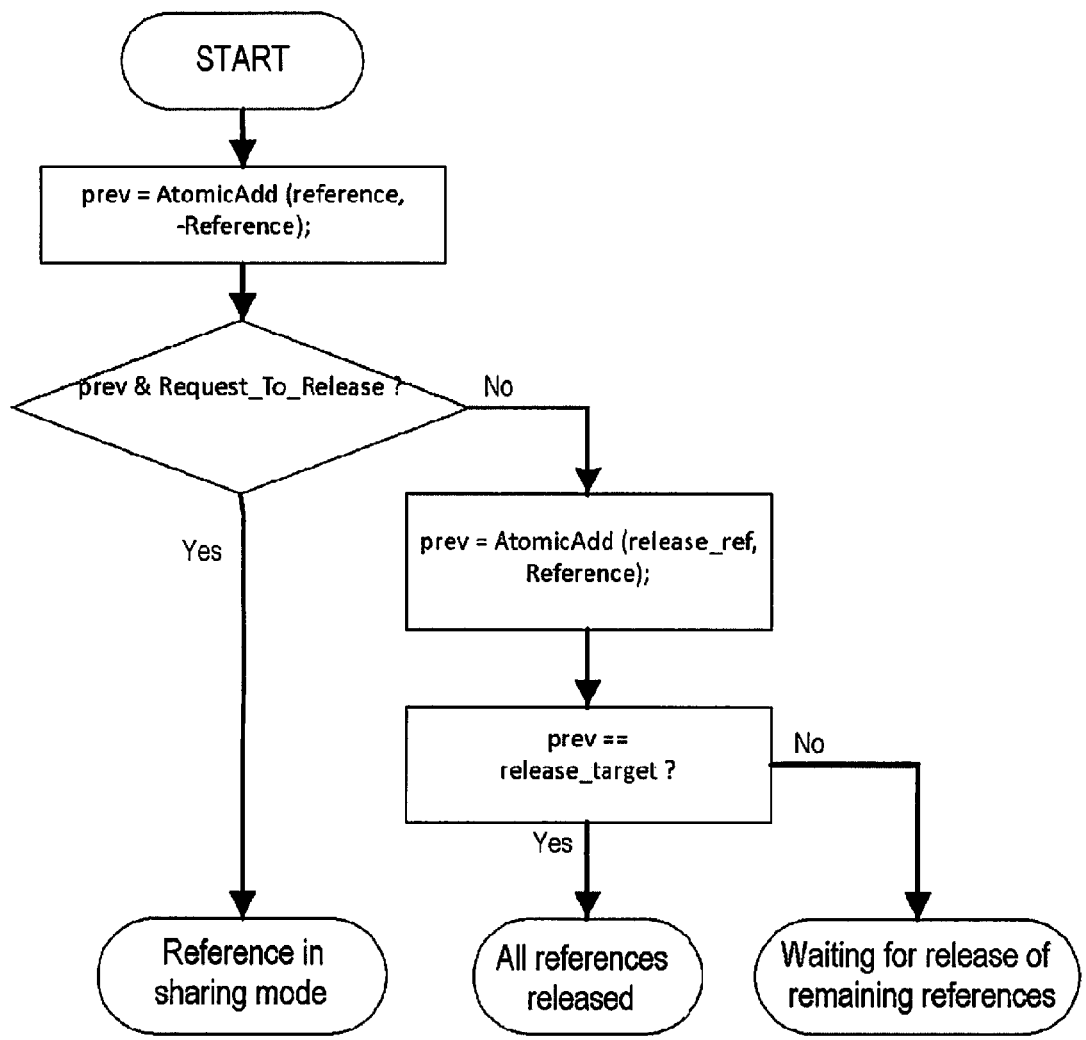
FIG. 10 shows the algorithm of the function ReleaseReference of the reference counting mechanism.

FIG. 10 is a flow chart illustrating operation of the function ReleaseReference for the reference counting mechanism.

All of the described procedures and algorithms can be implemented by a person skilled in programming (programmer) in application software on the basis of knowledge of possible implementations of the functions to be performed.

The present method makes possible to avoid delays in operation of processor units by eliminating the need to wait until other processor units complete processing of individual packets.

It should be noted that other embodiments of the method are possible that differ from those described above and depend on personal preferences in programming of individual actions and functions.

The invention claimed is:

1. A method for parallel processing of ordered data streams in a computer system comprising:
a first section adapted to
receive incoming data streams from external network connections;
divide the incoming data streams into portions;
provide attributes to each portion of each incoming data stream;
transfer portions of each incoming data stream to processor units for processing;
a plurality of processor units, wherein each processor unit comprises a processor and means for storing processed portions of incoming data streams and is adapted to
process portions of incoming data streams by a predetermined algorithm;
transfer the processed portions of the incoming data streams to respective output data streams;
store the processed portions of the incoming data streams until conditions occur for sending said portions to a respective output data stream;
transfer the processed portions of the incoming data streams to other processor units;
receive processed portions of incoming data streams from other processor units;
search for specified elements in the attributes of the portions of the incoming data streams;
wherein the first section is associated with the plurality of processor units;
the method comprising the steps of:
receiving incoming data streams from network connections in the first section;
transferring portions of the incoming data streams for processing to the processor units, wherein each portion of each incoming data stream is provided with attributes including:
an identifier of the incoming stream;
an identifier of a position of the portion in the incoming stream;

processing the portions of the incoming data streams in the processor units to obtain respective portions of output data streams;

providing a sequence of the portions of the output data streams from the processor units, said sequence corresponding to the sequence of the portions of the incoming data streams, said providing the sequence comprising:

searching for at least one processor unit which is processing a portion of a particular incoming data stream that has been located in a particular first stream before a portion already processed in said processor unit, and if the at least one processor units is found in the search:

selecting, among the at least one processor unit, a processor unit which is processing a portion of the particular incoming data stream that is closest to the processed portion of the particular incoming stream;

transferring the processed portion of the particular incoming data stream from said processor unit to the selected processor unit, along with the processed portions of the incoming data stream previously received from other processor units, if any;

if no such processor units are found in the search:

transferring the processed portions of the incoming data stream to a respective output data stream in which the sequence of portions matches the sequence of portions in the respective input stream, with account of processed portions of the incoming data stream previously received from other processor units.

* * * * *

UNITED STATES PATENT AND TRADEMARK OFFICE
CERTIFICATE OF CORRECTION

PATENT NO. : 9,069,625 B2
APPLICATION NO. : 13/938381
DATED : June 30, 2015
INVENTOR(S) : Morozov et al.

Page 1 of 1

It is certified that error appears in the above-identified patent and that said Letters Patent is hereby corrected as shown below:

In the Claims:

Column 17, claim 1, line 14, "processor units" should be --processor unit--.

Signed and Sealed this
Tenth Day of November, 2015

Michelle K. Lee
*Director of the United States Patent and Trademark Office*